United States Patent
Moon et al.

(10) Patent No.: US 10,157,023 B2
(45) Date of Patent: Dec. 18, 2018

(54) MEMORY CONTROLLER AND REQUEST SCHEDULING METHOD USING REQUEST QUEUES AND FIRST AND SECOND TOKENS

(71) Applicant: SK hynix Inc., Gyeonggi-do (KR)

(72) Inventors: Young-Suk Moon, Gyeonggi-do (KR); Hong-Sik Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/441,818

(22) Filed: Feb. 24, 2017

(65) Prior Publication Data
US 2017/0249104 A1     Aug. 31, 2017

(30) Foreign Application Priority Data

Feb. 25, 2016  (KR) .......................... 10-2016-0022712
Jan. 10, 2017  (KR) .......................... 10-2017-0003473

(51) Int. Cl.
*G06F 3/06* (2006.01)
*G06F 13/16* (2006.01)
*G06F 13/37* (2006.01)

(52) U.S. Cl.
CPC ............ *G06F 3/0659* (2013.01); *G06F 3/061* (2013.01); *G06F 3/0673* (2013.01);
(Continued)

(58) Field of Classification Search
CPC .. G06F 3/0659; G06F 3/0673; G06F 13/1668; G06F 13/0642; G06F 13/0652;
(Continued)

(56) References Cited

U.S. PATENT DOCUMENTS 5,918,055 A * 6/1999 Crawford ................. G06F 9/50
                                                710/1
6,182,177 B1 * 1/2001 Harriman ............... G06F 13/18
                                                710/112
(Continued)

*Primary Examiner* — Glenn Gossage
(74) *Attorney, Agent, or Firm* — IP & T Group LLP

(57) ABSTRACT

A memory controller includes a plurality of request queues for storing requests transmitted from corresponding host devices among a plurality of host devices, and a token information generation unit for generating information related to the numbers of first and second tokens corresponding to the plurality of respective host devices. The memory controller also includes a request scheduler for selecting repeatedly and sequentially the plurality of request queues, and outputting requests stored in a selected request queue, by using the first and second tokens, wherein the request scheduler outputs one request per one first token and, when first tokens are all consumed, outputs one request per one second token. The scheduler may output requests according to a first-ready first-come first-served (FR-FCFS) rule when using a first token, and output requests according to a first-ready (FR) rule when using a second token. The number of first tokens and second tokens may depend on characteristics of the host devices. A bandwidth control unit may control the number of first and second tokens based on bandwidth. The scheduler may stop outputting requests of a currently selected request queue, and output requests of a request queue corresponding to a top-priority host device.

18 Claims, 8 Drawing Sheets

(52) U.S. Cl.
CPC ...... *G06F 13/1642* (2013.01); *G06F 13/1668*
(2013.01); *G06F 13/37* (2013.01)

(58) Field of Classification Search
CPC ............. G06F 13/0605; G06F 13/1642; G06F
13/1652; G06F 13/1605; G06F 13/37;
G06F 3/061
See application file for complete search history.

(56) References Cited

U.S. PATENT DOCUMENTS

| | | | |
|---|---|---|---|
| 7,249,210 B2* | 7/2007 | Ganasan | G06F 13/362 710/117 |
| 7,965,732 B2 | 6/2011 | Rabbat et al. | |
| 8,356,129 B2* | 1/2013 | Tsuji | G06F 13/1673 710/244 |
| 2007/0294448 A1* | 12/2007 | Nozaki | G06F 13/1642 710/240 |
| 2008/0112313 A1* | 5/2008 | Terakawa | G06F 9/5011 370/229 |
| 2009/0217273 A1* | 8/2009 | Mutlu | G06F 9/4881 718/101 |
| 2010/0083262 A1* | 4/2010 | Gulati | G06F 9/5011 718/102 |
| 2010/0306483 A1* | 12/2010 | Buick | G06F 9/546 711/156 |
| 2010/0325327 A1* | 12/2010 | Marietta | G06F 13/1642 710/240 |
| 2012/0054760 A1* | 3/2012 | Chung | G06F 9/526 718/103 |
| 2014/0372711 A1 | 12/2014 | O'Connor et al. | |
| 2015/0046642 A1* | 2/2015 | Lee | G06F 13/14 711/105 |
| 2016/0342541 A1* | 11/2016 | Tokoyoda | G06F 13/1673 |

\* cited by examiner

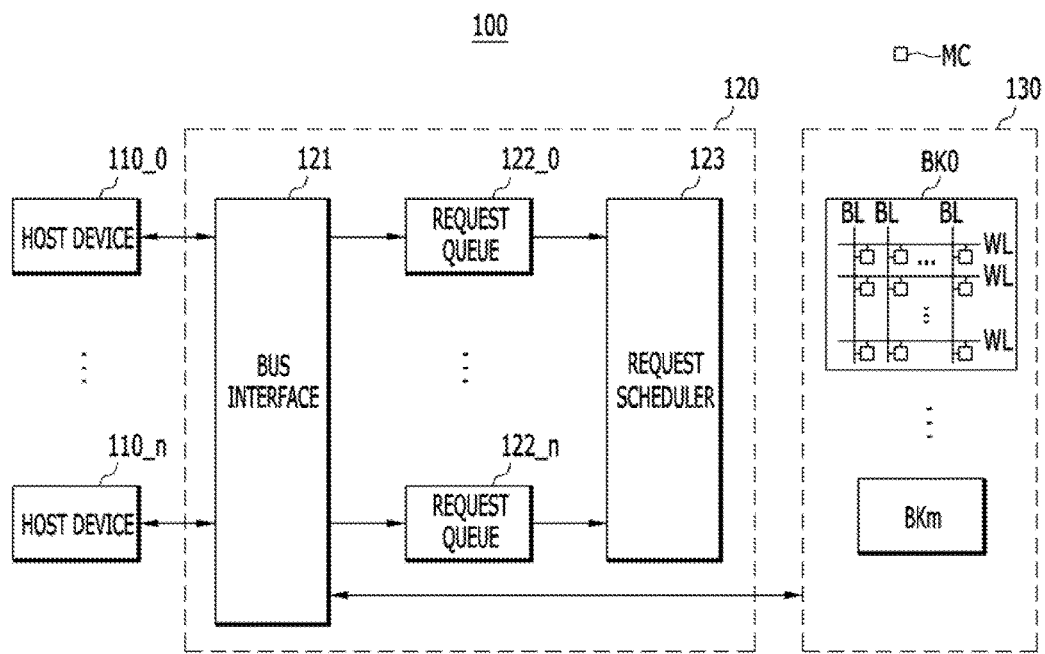

| | | TK1_0 | 2 | 1 | 0 | 0 | 2 | 2 | 2 | 1 | 0 | 0 | 2 | 2 | 2 | 2 | 2 | 2 |
|---|---|---|---|---|---|---|---|---|---|---|---|---|---|---|---|---|---|---|
| H0 | H1 | TK2_0 | 4 | 4 | 4 | 3 | 4 | 4 | 4 | 4 | 4 | 3 | 4 | 4 | 4 | 4 | 4 | 4 |
| A1 | C1 | TK1_1 | 1 | 1 | 1 | 1 | 1 | 0 | 1 | 1 | 1 | 1 | 0 | 0 | 0 | 0 | 1 | 0 |
| B1 | D1 | TK2_1 | 4 | 4 | 4 | 4 | 4 | 4 | 4 | 4 | 4 | 4 | 4 | 3 | 2 | 1 | 4 | 4 |
| A2 | C2 | OUTPUTTED REQUESTS | A1 | A2 | A3 | A4 | C1 | C2 | B1 | B2 | B3 | B4 | D1 | D2 | D3 | D4 | D5 | D6 |
| B2 | D2 | | | | | | | | | | | | | | | | | |
| A3 | D3 | | | | | | | | | | | | | | | | | |
| B3 | D4 | | | | | | | | | | | | | | | | | |
| A4 | D5 | | | | | | | | | | | | | | | | | |
| B4 | D6 | | | | | | | | | | | | | | | | | |

US 10,157,023 B2

MEMORY CONTROLLER AND REQUEST SCHEDULING METHOD USING REQUEST QUEUES AND FIRST AND SECOND TOKENS

CROSS-REFERENCE TO RELATED APPLICATION

This application claims priority under 35 U.S.C. § 119 to Korean Patent Application No. 10-2016-0022712 filed on Feb. 25, 2016 and Korean Patent Application No. 10-2017-0003473 filed on Jan. 10, 2017, the entire contents of which are incorporated herein by reference.

TECHNICAL FIELD

This patent document relates to a memory controller and a request scheduling method of the memory controller.

DISCUSSION OF THE RELATED ART

A memory controller may determine a processing sequence of a plurality of requests provided from host devices, and output the requests to a memory device in the determined processing sequence. In order to determine a processing sequence of a plurality of requests, a conventional memory controller uses a scheduling method according to one of a plurality of rules such as first-come first-served (FCFS) and first-ready first-come first-served (FR-FCFS). In this way, the conventional memory controller may perform scheduling according to a fixed standard, however, it may not provide optimized scheduling in conformity with the characteristics of host devices.

SUMMARY

Various embodiments are directed to a memory controller and a request scheduling method of the memory controller, in which an output sequence of stored requests is determined by using two different kinds of tokens allocated to respective host devices, thereby optimizing an output sequence of requests of a plurality of host devices.

In an embodiment, a memory controller may include: a plurality of request queues, each request queue for storing requests received from a corresponding host device among a plurality of host devices; a token information generation unit for generating information related to the numbers of at least first and second tokens corresponding to each of the plurality of host devices; and a request scheduler for selecting repeatedly and sequentially one among the plurality of request queues, and outputting requests stored in a selected request queue, by using first and second tokens, wherein the request scheduler outputs one request per one first token and, when all the first tokens are consumed, outputs one request per one second token.

In an embodiment, a request scheduling method of a memory controller which outputs requests transmitted from a plurality of host devices, to a memory device may include: allocating at least one first token and at least one second token to each of the plurality of host devices; storing requests received from the plurality of host devices, in a plurality of request queues respectively corresponding to the plurality of host devices; selecting one request queue among the plurality of request queues; outputting each of the requests stored in the selected request queue, per one first token; and outputting, when all the first tokens are consumed, each of requests stored and remained in the selected request queue, per one second token.

BRIEF DESCRIPTION OF THE DRAWINGS

FIG. 1 is a diagram illustrating a data processing system including a memory controller in accordance with an embodiment.

FIG. 2 is a diagram illustrating the scheduling of requests in consideration of at least two rules among a plurality of rules.

DETAILED DESCRIPTION

Figure 3:
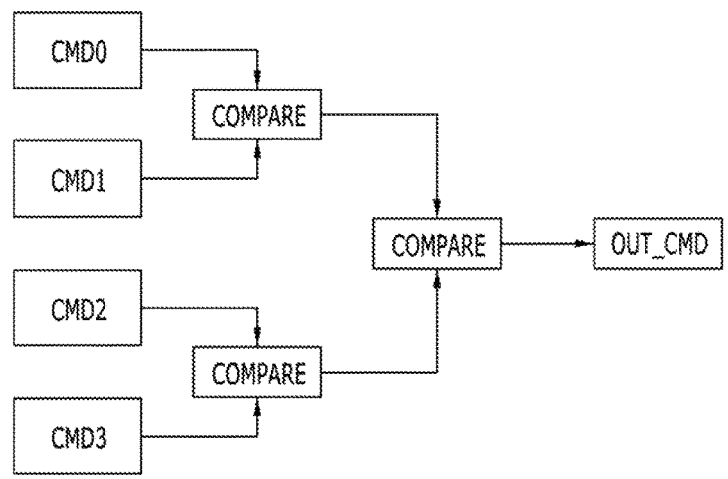
FIG. 3 is a diagram illustrating a sequence of request comparisons useful in explaining a problem likely to be caused in the scheduling of requests as illustrated in FIG. 2.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram illustrating a data processing system 100.

Referring to FIG. 1, the data processing system 100 may include a plurality of host devices 110_0 to 110_n (where n is a natural number), a memory controller 120, and a memory device 130.

Each of the plurality of host devices 110_0 to 110_n may be one of devices such as a central processing unit (CPU), a graphic processing unit (GPU) and a display, and make a request to the memory controller 120 as the occasion demands.

The memory controller 120 may control the memory device 130 by scheduling the requests received from the host devices 110_0 to 110_n, and transfer data between the memory device 130 and the plurality of host devices 110_0 to 110_n. The memory controller 120 may include a bus interface 121, a plurality of request queues 122_0 to 122_n, and a request scheduler 123.

The bus interface 121 may transfer the requests received from the host devices 110_0 to 110_n, to the corresponding request queues 122_0 to 122_n, and transfer data between the plurality of host devices 110_0 to 110_n and the memory device 130.

The plurality of request queues 122_0 to 122_n may be in one-to-one correspondence to the plurality of host devices 110_0 to 110_n, and may store the requests received through the bus interface 121 from the corresponding host devices 110_0 to 110_n, in sequence in the order in which they are inputted.

The request scheduler 123 may schedule the requests stored in the plurality of request queues 122_0 to 122_n, according to a preset rule, and output the requests to the memory device 130 in a scheduled sequence.

The memory device 130 may store the data received through the bus interface 121 or output stored data, according to a request received from the memory controller 120. The memory device 130 may include a plurality of memory banks BK0 to BKm (where m is a natural number) for storing data. Each of the plurality of memory banks BK0 to BKm may include a plurality of word lines WL, a plurality of bit lines BL, and a plurality of memory cells MC. In FIG. 1, a partial configuration is illustrated for only the memory bank BK0 for the sake of convenience in illustration.

Because host devices have different characteristics according to the kinds thereof in terms of required quality of service (QoS), the memory controller 120 transmits the requests received from the host devices, to the memory device 130 in an optimized sequence in consideration of the characteristics of the host devices. For example, a low latency may be required in the case of a central processing unit, a wide bandwidth and a moderate latency may be required in the case of a display, and a wide bandwidth may be required in the case of a graphic processing unit. In this situation, if the requests received from respectively different host devices are transmitted to the memory device 130 in the same sequence in which they are received, operations corresponding to the requests may not be performed efficiently.

In this regard, examples of methods for processing the requests received from different host devices may include, (1) a method of using a timeout rule, (2) a method of using a priority rule, (3) a method of using a bandwidth calibration rule, and so forth.

More specifically, a first method of using a timeout rule may be a method in which different threshold times are allocated to respective host devices and, among the requests stored in request queues, requests of which threshold times have passed after they were received are outputted. For example, in the case where a threshold time of 5 clocks is allocated to a host device A and a threshold time of 10 clocks is allocated to a host device B, a request received from the host device A may be outputted when 5 clocks have passed after it was received, and a request received from the host device B may be outputted when 10 clocks have passed after it was received.

A second method of using a priority rule may be a method in which requests are outputted in an order of high priority by considering the priorities allocated to the requests. The priorities allocated to the requests may be fixedly set for each respective host device or may be allocated differently according to the type of a requests. For example, in the case where a host device A is allocated with a priority higher than a host device B, if a request of the host device A and a request of the host device B are received simultaneously, the request received from the host device A may be outputted first.

A third method of using a bandwidth calibration rule may be a method in which a bandwidth to be allocated to each host device (hereinafter, referred to as a target bandwidth) is set and, as a result of monitoring the bandwidth actually used in the host device (hereinafter, referred to as an actual bandwidth), a priority for the corresponding host device is lowered if the actual bandwidth is wider than the target bandwidth and is raised if the actual bandwidth is narrower than the target bandwidth. For example, by monitoring a bandwidth used by a host device A and a bandwidth used by a host device B for a predetermined period and comparing the bandwidths of the host devices A and B with their target bandwidths, a priority of the host device A is lowered in the case where the bandwidth of the host device A is wider than the target bandwidth, and a priority of the host device B is raised in the case where the bandwidth of the host device B is narrower than the target bandwidth.

A fourth method of using a first-come first-served (FCFS) rule may be a method in which a request received earlier is outputted earlier.

A fifth method of using a first-ready, first-come, first-served (FR-FCFS) rule may be a method in which a request received earlier is outputted earlier but, in the case where a currently open (or activated) row (or word line) exists, a request for such a row is outputted earlier.

A sixth method of using a first-ready (FR) rule may be a method in which, in the case where a currently open (or activated) row (or word line) exists, a request for such a row is outputted earlier.

Scheduling of the received requests may be performed in consideration of at least one rule among the above rules. For example, when actually scheduling requests, while scheduling may be performed in consideration of only one rule among the above rules, scheduling may also be performed in consideration of at least two rules in a combined manner.

FIG. 2 is a diagram illustrating the scheduling of requests in consideration of at least two rules among the above-described rules.

Referring to FIG. 2, respective requests (or commands) CMD0 to CMD3 may be determined in an output sequence depending on four conditions referred to as 'TIMEOUT', 'PRIORITY', 'ROWHIT' and 'STARVATION.'

'TIMEOUT' may represent whether a time having passed from when each request was received (hereinafter, referred to as a passed time) is equal to or longer than a threshold time allocated to the corresponding request. 'T' represents that a passed time is equal to or longer than the threshold time, and 'F' represents that a passed time is shorter than the threshold time. Hence, a request of which 'TIMEOUT' is 'T' may be outputted earlier than a request of which 'TIMEOUT' is 'F.'

'PRIORITY' may represent a priority value that is allocated to each request, and a request of a higher priority may be allocated with a higher priority value. A request of a higher priority value may be outputted earlier than a request of a lower priority value.

'ROWHIT' may represent whether a row corresponding to a request is in a currently open state. 'T' may represent that a row corresponding to a request is in a currently open state, and 'F' may represent that a row corresponding to a request is not in a currently open state. A request of which 'ROWHIT' is 'T' may be outputted earlier than a request of which 'ROWHIT' is 'F.'

'STARVATION' may represent a delayed time by which a received request is not outputted. A request of a longer delayed time (e.g., 10 or 8) may be outputted earlier than a request of a shorter delayed time (e.g., 7 or 3).

Different weights may be allocated to the respective conditions depending on a design. FIG. 2 illustrates a case where weights are allocated in the sequence of 'TIMEOUT', 'PRIORITY', 'ROWHIT' and 'STARVATION' with the highest weight being allocated to the 'TIMEOUT.' Therefore, in scheduling, 'TIMEOUT' may be considered most important, 'PRIORITY' may be considered next, 'ROWHIT' may be considered next, and 'STARVATION' may be considered last.

For example, in the case where two requests are different in 'TIMEOUT,' a request of which 'TIMEOUT' is 'T' may be outputted earlier than a request of which 'TIMEOUT' is 'F,' regardless of the remaining three conditions (i.e., PRIORITY, ROWHIT, STARVATION). Next, in the case where two requests are the same in 'TIMEOUT' (both are 'T' or 'F') and are different in 'PRIORITY,' a request of which 'PRIORITY' is higher may be outputted earlier than a request of which 'PRIORITY' is lower, regardless of the remaining two conditions (i.e., ROWHIT, STARVATION). Next, in the case where two requests are the same in 'TIMEOUT' and 'PRIORITY' and are different in 'ROWHIT,' a request of which 'ROWHIT' is 'T' may be outputted earlier than a request of which 'ROWHIT' is 'F,' regardless of the remaining one condition (i.e., STARVATION). Lastly, in the case where two requests are the same in 'TIMEOUT', 'PRIORITY' and 'ROWHIT' and are different in 'STARVATION,' a request of which 'STARVATION' is higher may be outputted earlier than a request of which 'STARVATION' is lower.

When scheduling the requests CMD0 to CMD3 shown in FIG. 2 by considering the above conditions, a sequence of CMD0, CMD1, CMD2 and CMD3 may result. The weight allocated to each of the conditions may be changed depending on a design.

FIG. 3 is a diagram illustrating a sequence of request comparisons useful in explaining a problem likely to be caused in the scheduling of requests as illustrated in FIG. 2.

Referring to FIG. 3, the request scheduler 123 of FIG. 1 may select the sequence in which the requests are to be outputted OUT_CMD, by comparing the conditions (COMPARE) 'TIMEOUT', 'PRIORITY', 'ROWHIT' and 'STARVATION' of the requests CMD0 to CMD3 which are stored in the request queues 122_0 to 122_n. For example, as illustrated in FIG. 3, the comparison may include comparing the requests CMD0 and CMD1 based on the conditions, comparing the requests CMD2 and CMD3, and then comparing the comparison results to output the sequence OUT_CMD which according to the conditions and weights of FIG. 2 should be CMD0-CMD1-CMD2-CMD3.

Although, as illustrated in FIG. 3, the method of performing scheduling by considering all the conditions of 'TIMEOUT', 'PRIORITY', 'ROWHIT' and 'STARVATION' has an advantage in that the requests CMD0 to CMD3 may be considered all at once, a problem may be caused in that, since the number of comparison times increases as the number of requests increases, an operation may be slowed and the area of a circuit needed for the comparison increases.

Figure 4:
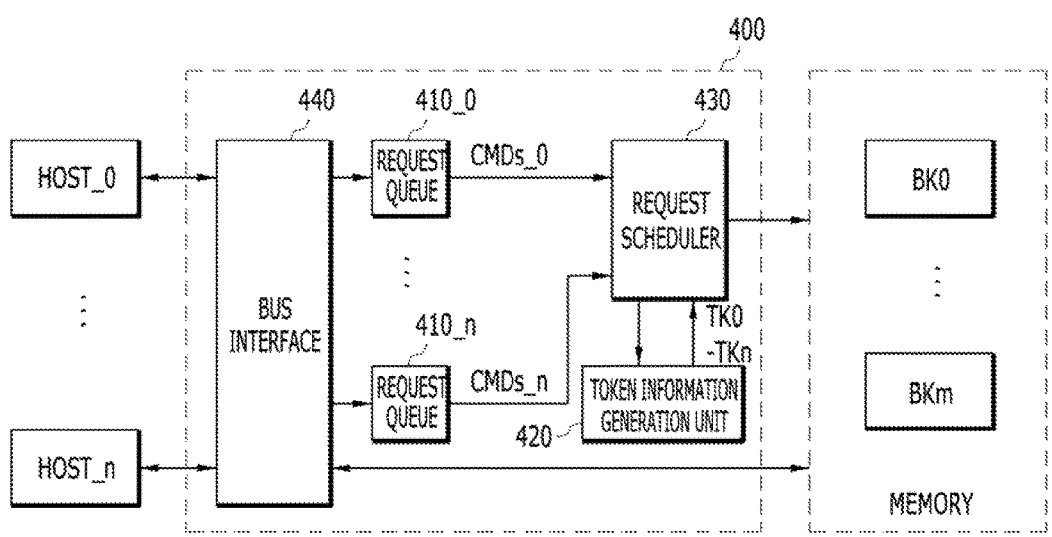
FIG. 4 is a diagram illustrating a data processing system including a memory controller and peripheral configurations in accordance with another embodiment.

FIG. 4 is a diagram illustrating a data processing system including a memory controller 400 and peripheral configurations in accordance with another embodiment.

Referring to FIG. 4, the data processing system may include a plurality of host devices HOST_0 to HOST_n (where n is a natural number), the memory controller 400, and a memory device MEMORY. The memory controller 400 may include a plurality of request queues 410_0 to 410_n, a token information generation unit 420, a request scheduler 430, and a bus interface 440.

Each of the plurality of host devices HOST_0 to HOST_n may be a device such as a central processing unit (CPU), a graphic processing unit (GPU), a display, a video, an audio and a camera, and may transmit a request and data to the memory controller 400 or receive data from the memory controller 400, as the occasion demands.

The memory device MEMORY may store the data received through the bus interface 440 or output stored data, according to a request received from the memory controller 400. The memory device MEMORY may include a plurality of memory banks BK0 to BKm (where m is a natural number) for storing data. Each of the plurality of memory banks BK0 to BKm may include a plurality of word lines (or rows) WL, a plurality of bit lines (or columns) BL, and a plurality of memory cells MC (see the memory bank BK0 of FIG. 1).

The memory controller 400 may receive read or write requests from the host devices HOST_0 to HOST_n, and in correspondence to this, control the memory device MEMORY to perform requested operations. To this end, the memory controller 400 may schedule the requests received from the plurality of host devices HOST_0 to HOST_n, and output them to the memory device MEMORY. Also, the memory controller 400 may transfer the data received from the host devices HOST_0 to HOST_n, to the memory device MEMORY, or transfer the data received from the memory device MEMORY, to the host devices HOST_0 to HOST_n.

The plurality of request queues 410_0 to 410_n may store the requests received from corresponding host devices among the plurality of host devices HOST_0 to HOST_n, in sequences in which they are received. The plurality of request queues 410_0 to 410_n may output stored requests CMDs_0 to CMDs_n to the request scheduler 430.

The token information generation unit 420 may generate and output information (hereinafter, referred to as token information) TK0 to TKn related to the numbers of first and second tokens corresponding to the respective host devices HOST_0 to HOST_n. In the following descriptions, a token may be a cost that is used to output a request. For example, in order to output a request of a host device A, one of one or more tokens allocated to the host device A may have to be consumed. A first token and a second token may be used according to different rules among the above-described rules. In the case where requests are to be outputted by using the first token, the requests may be outputted according to the first-ready first-come first-served (FR-FCFS) rule. Second tokens are tokens which are used after all first tokens are consumed. In the case where requests are to be outputted by using second tokens, the requests may be outputted according to the first-ready (FR) rule.

If a request is outputted by using a first or second token, the token information generation unit 420 may reflect this on the token information TK0 to TKn. If a sequence in which requests of a host device are outputted ends, the token information generation unit 420 may initialize the token information of the corresponding host device. Therefore, if a request queue next to a selected request queue is selected, the token information generation unit 420 may initialize token information corresponding to the previously selected request queue. That is to say, if requests are outputted by using first or second tokens as a certain host device is selected and then a next host device is selected, the numbers of first and second tokens of the previously selected host device may be returned to initial states.

The numbers of first and second tokens allocated to the plurality of host devices HOST_0 to HOST_n may be determined depending on characteristics required in the data processing system or the characteristics of the respective host devices HOST_0 to HOST_n. For example, in the case where high performance is required in the data processing system, a middle number of first tokens and a large number of second tokens may be allocated to each host device, while, in the case where high fairness is required, a small number of first tokens and a middle number of second tokens may be allocated to each host device. Further, in the case where a host device such as a CPU which requires high quality of service (QoS) and a host device such as a GPU which requires a wide bandwidth coexist in the data processing system, a large number of first tokens and a small number of second tokens may be allocated to the host device such as a CPU, and a small number of first tokens and a middle number of second tokens may be allocated to the host device such as a GPU.

The request scheduler 430 may select repeatedly and sequentially the plurality of request queues 410_0 to 410_n, and output requests stored in a selected request queue, by using first and second tokens. The request scheduler 430 may output one request per one first token, and, when all the first tokens are consumed, the request scheduler 430 may output one request per one second token. The request scheduler 430 may output a request by using preferentially a first token, and only when all the first tokens are used, the request scheduler 430 may output a request by using a second token.

In the case where an output request does not exist any more in a selected request queue even though at least one first or second token remains or in the case where, after one or more first tokens are all used, a request capable of being outputted by using a second token does not exist among the requests stored in a selected request queue, the request scheduler 430 may select a request queue next to the selected request queue.

The request scheduler 430 may output requests sequentially according to the first-ready first-come first-served (FR-FCFS) rule in the case of outputting requests by using first tokens, and output requests sequentially according to the first-ready (FR) rule in the case of outputting requests by using second tokens. In the case of determining a sequence of requests according to the FR-FCFS rule or the FR rule, whether to be the same as a row address of the memory device MEMORY corresponding to an immediately previously selected request may be considered. In other words, when selecting a request according to the FR rule, whether a request corresponds to a row in a currently open state may be considered. In the case where one or more requests corresponding to a row of an open state exist, a request received earlier among the requests is outputted earlier, while, in the case where one or more requests corresponding to a row of an open state do not exist, the requests may not be outputted.

The request scheduler 430 may skip selection of a request queue in which no request is stored and select a next request queue, among the plurality of request queues 410_0 to 410_n. In some embodiments, the request scheduler 430 may select a request queue according to round robin scheduling.

The bus interface 440 may transfer the requests received from the host devices HOST_0 to HOST_n, to the corresponding request queues 410_0 to 410_n, and transfer the data received from the plurality of host devices HOST_0 to HOST_n, to the memory device MEMORY, or the data received from the memory device MEMORY, to the plurality of host devices HOST_0 to HOST_n.

The numbers of first and second tokens allocated to the plurality of host devices HOST_0 to HOST_n may be fixed, but may be changed while the data processing system operates, as the occasion demands. The data processing system may schedule requests by using two different kinds of tokens, thereby easily controlling trade-off between high performance and high fairness. Therefore, by setting tokens by host devices in conformity with requirements of the data processing system, it is possible to control QoS precisely and flexibly.

Figures 5, 6:
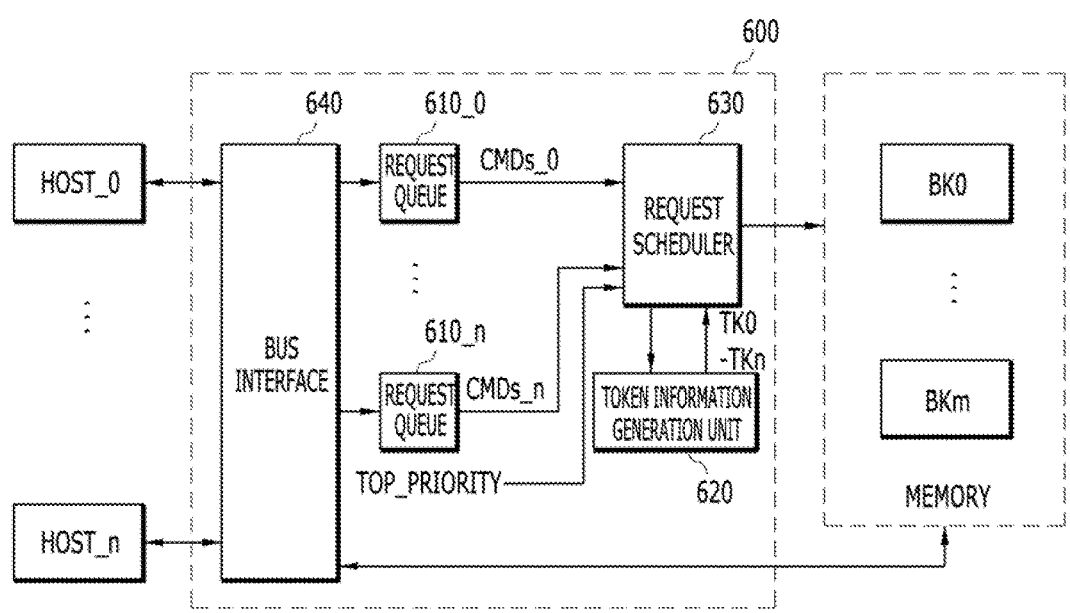
FIG. 5 is a diagram illustrating an operation of the memory controller shown in FIG. 4.
FIG. 6 is a diagram illustrating a data processing system including a memory controller and peripheral configurations in accordance with still another embodiment.

FIG. 5 is a diagram illustrating the operation of the memory controller 400 shown in FIG. 4.

With reference to FIG. 5, descriptions will be made for a scheduling operation in the case where the data processing system includes two host devices HOST_0 and HOST_1. Referring to FIG. 5, for the first host device HOST_0, the number of first tokens allocated is 2, and the number of second tokens allocated is 4. For the second host device HOST_1, the number of first tokens allocated is 1, and the number of second tokens allocated is 4.

'H0' may represent a request queue corresponding to the first host device HOST_0, and the contents described in the boxes of the request queue H0 may represent the requests stored as received from the first host device HOST_0. In H0, a request positioned higher is a request received earlier. Hence, A1 is the earliest received request in the H0 queue, while B4 is the most recently received request in the H0 queue.

'H1' may represent a request queue corresponding to the second host device HOST_1, and the contents described in the boxes of the request queue H1 may represent the requests stored as received from the second host device HOST_1. In H1, a request positioned higher is a request received a longer time before, that is, a request received earlier. Hence, C1 is the earliest received request in the H1 queue, while D6 is the most recently received request in the H0 queue.

'TK1_0' may be the number of first tokens corresponding to the first host device HOST_0, and 'TK2_0' may be the number of second tokens corresponding to the first host device HOST_0. 'TK1_1' may be the number of first tokens corresponding to the second host device HOST_1, and 'TK2_1' may be the number of second tokens corresponding to the second host device HOST_1.

For reference, a request is constructed by two symbols. Between the two symbols, a first symbol may represent a row address corresponding to the request, and a second symbol may represent a column address corresponding to the request. For example, a request A1 may be a request for a memory cell corresponding to a row address A and a column address 1.

Hereinbelow, descriptions may be made for the scheduling operation of the request scheduler 430, on the assumption that the request queues H0 and H1 corresponding to the first and second host devices HOST_0 and HOST_1 are selected alternately. Moreover, it may be assumed that new requests are not received from the host devices HOST_0 and HOST_1 until all the requests which are currently stored in the request queues H0 and H1 are outputted.

First, because requests exist in the request queue H0, the request queue H0 may be selected, the first token of the first host device HOST_0 may be used, and a request A1 may be outputted. Next, the second token of the first host device HOST_0 may be used, and a request A2 received earliest among requests A2 to A4 having the same row address as the request A1 may be outputted. Then, because a state in which all of the first tokens of the first host device HOST_0 are consumed, in order to output a request received from the first host device HOST_0, by using a second token, a request corresponding to an open row should exist among the requests stored in the request queue H0. A request corresponding to an open row may represent a request which has the same row address as a recently outputted request.

Since the row address of the recently outputted request A2 is A and the requests A3 and A4 having the row address of A exist among the requests stored in the request queue H0, the request A3 may be outputted by first using a second token, and then the request A4 may be outputted by next using a second token. At this time, because a state in which a request having the row address of A does not exist any more in the request queue H0 after the request A4 is outputted and all of the first tokens corresponding to the first host device HOST_0 are consumed, the requests received from the first host device HOST_0 may not be outputted any more. Therefore, selection of the request queue H0 is released, and the next request queue H1 may be selected. If the next request queue H1 is selected, the token information of the previously selected request queue H0 may be reset to their initial values. Namely, the numbers of first and second tokens corresponding to the first host device HOST_0 may be initialized to 2 and 4, respectively.

Next, the requests stored in the request queue H1 may be outputted by using the first and second tokens allocated to the second host device HOST_1. First, a request C1 may be outputted by using a first token. If the first token is consumed, a request received from the second host device HOST_1 may be outputted by using a second token. In the case where a second token is used, only a request of which row address is the same as the recently outputted request C1 may be outputted. Therefore, a request C2 may be outputted by using a second token, and, since a request corresponding to the open row does not exist any more, the request queue H0 may be selected again. At the same time as this, the numbers of first and second tokens corresponding to the second host device HOST_1 may be initialized, i.e., reset to their initial values of 1 and 4, respectively.

Next, the requests received from the first host device HOST_0 may be outputted. When sequentially arranging requests to be outputted and tokens to be used, a request B1 by a first token, a request B2 by a first token, a request B3 by a second token and a request B4 by a second token may be outputted in that sequence. Thereafter, since a stored request does not exist any more in the request queue H0, the request queue H1 may be selected and the requests received from the second host device HOST_1 may be outputted. At this time, the numbers of the first and second tokens corresponding to the first host device HOST_0 may be initialized to their initial values of 2 and 4, respectively.

Next, when sequentially arranging requests to be outputted and tokens to be used to output the requests received from the second host device HOST_1, a request D1 by a first token, a request D2 by a second token, a request D3 by a second token, a request D4 by a second token and a request D5 by a second token may be outputted in that sequence. Since the first and second tokens are then all consumed, the request queue H0 should be selected next. However, since a stored request does not exist any more in the request queue H0, selection of the request queue H0 may be skipped, and the request queue H1 may be selected again. Since the request queue H1 is one which is reselected, when the previous selection of the request queue H1 is released, the numbers of first and second tokens corresponding to the second host device HOST_1 may be initialized to 1 and 4, respectively. Therefore, a request D6 may be outputted by using a first token.

In this way, the memory controller 400 may repeatedly and sequentially select the plurality of request queues H0 and H1, select and output the requests stored in a selected request queue by using first tokens according to the FR-FCFS rule, and select and output the requests stored in the selected request queue by using second tokens according to the FR rule when the first tokens are all used.

FIG. 6 is a diagram illustrating a data processing system including a memory controller 600 and peripheral configurations in accordance with still another embodiment.

Referring to FIG. 6, the data processing system may include a plurality of host devices HOST_0 to HOST_n (where n is a natural number), the memory controller 600, and a memory device MEMORY. The memory controller 600 may include a plurality of request queues 610_0 to 610_n, a token information generation unit 620, a request scheduler 630, and a bus interface 640.

Unlike the data processing system of FIG. 4, in the data processing system of FIG. 6, a top-priority host device may exist among the plurality of host devices HOST_0 to HOST_n. The top-priority host device as a host device which requires a quick response to a request may be, for example, a host device which requires a low latency, such as a CPU.

The configuration and operation of the memory controller 600 of FIG. 6 may be basically similar to the configuration and operation of the memory controller 400 of FIG. 4.

However, in the case where at least one host device among the plurality of host devices HOST_0 to HOST_n is set as a top-priority host device, if a request is received from the top-priority host device, the request scheduler 630 of the memory controller 600 may stop an operation of outputting the requests of a currently selected request queue, select a request queue corresponding to the top-priority host device, and output the requests of the selected request queue corresponding to the top-priority host device.

To this end, the request queue corresponding to the top-priority host device among the plurality of request queues 610_0 to 610_n may activate a top-priority signal TOP_PRIORITY when a request is received therein. The request scheduler 630 may temporarily stop a request output operation that is being performed, when the top-priority signal TOP_PRIORITY is activated, output preferentially the requests received in the request queue corresponding to the top-priority host device, and then resume the stopped output of a request. The top-priority host device, as at least one host device among the plurality of host devices HOST_0 to HOST_n, may be set fixedly or flexibly.

Figure 7:
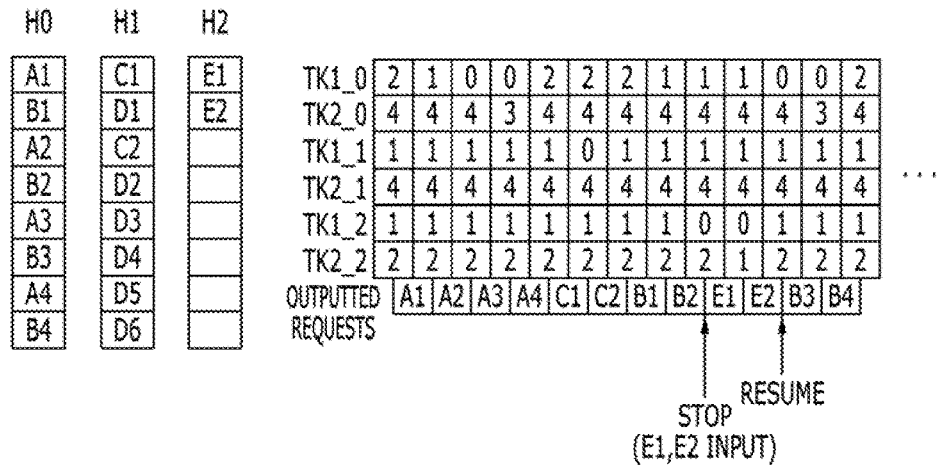
FIG. 7 is a diagram illustrating an operation of the memory controller shown in FIG. 6.

FIG. 7 is a diagram illustrating the operation of the memory controller 600 shown in FIG. 6.

With reference to FIG. 7, descriptions will be made for a scheduling operation in the case where the data processing system includes three host devices HOST_0 to HOST_2. Referring to FIG. 7, for the first host device HOST_0, the number of first tokens allocated is 2, and the number of second tokens allocated is 4. For the second host device HOST_1, the number of first tokens allocated is 1, and the number of second tokens allocated is 4. For the third host device HOST_2, the number of first tokens allocated is 1, and the number of second tokens allocated is 2 and the third host device HOST_2 is a top-priority host device.

'TK1_2' may be the number of first tokens corresponding to the third host device HOST_2, and 'TK2_2' may be the number of second tokens corresponding to the third host device HOST_2.

It is assumed that the requests stored in request queues H0 to H1 in an initial state are as shown in FIG. 7. It is assumed that no request is stored in the request queue H2. In this case, since selection of the request queue H2 is skipped, a sequence in which requests are outputted may be the same as shown in FIG. 7. It may be assumed that requests are received from the host device HOST_2 as a top-priority host device while the request scheduler 630 is outputting requests. In this case, the request scheduler 630 of FIG. 6 may temporarily stop an operation of scheduling and outputting the requests of a currently selected request queue (i.e., STOP operation), and output requests E1 and E2 received from the top-priority host device HOST_2. If the output of the requests E1 and E2 received from the top-priority host device HOST_2 is completed, the stopped output operation of the request queue may be resumed (i.e., RESUME operation).

Figure 8:
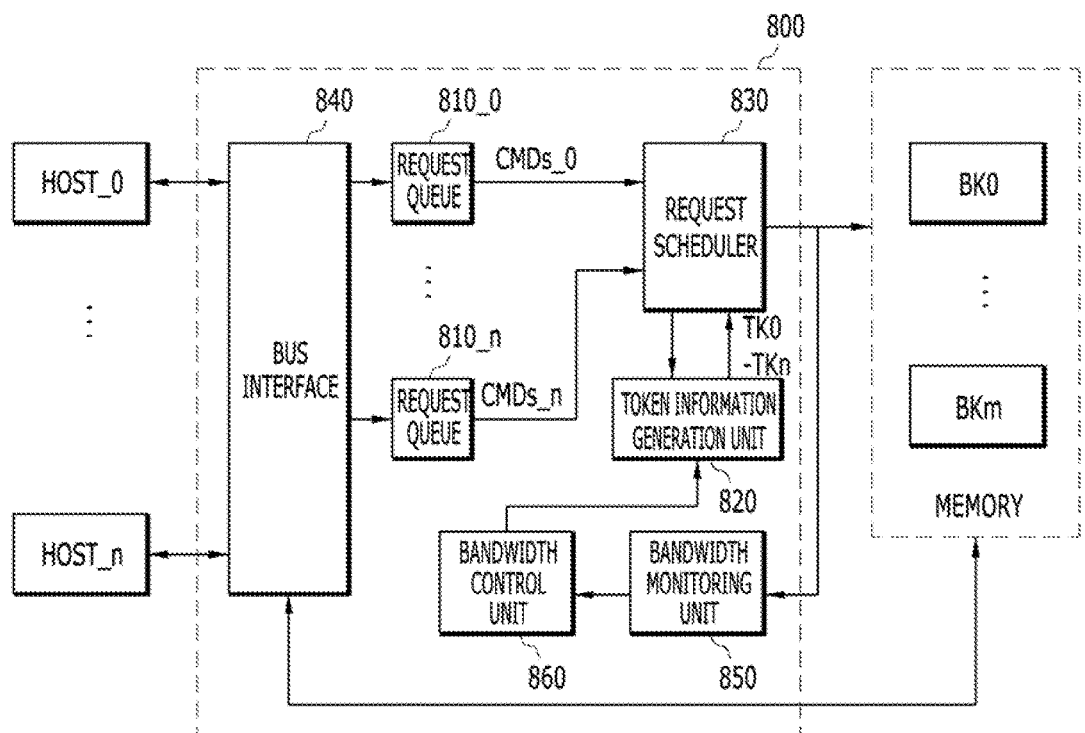
FIG. 8 is a diagram illustrating a data processing system including a memory controller and peripheral configurations in accordance with still yet another embodiment.

FIG. 8 is a diagram illustrating a data processing system including a memory controller 800 and peripheral configurations in accordance with still yet another embodiment.

Referring to FIG. 8, the data processing system may include a plurality of host devices HOST_0 to HOST_n (where n is a natural number), the memory controller 800, and a memory device MEMORY. The memory controller 800 may include a plurality of request queues 810_0 to 810_n, a token information generation unit 820, a request scheduler 830, a bus interface 840, a bandwidth monitoring unit 850, and a bandwidth control unit 860.

Unlike the data processing system of FIG. 4, in the data processing system of FIG. 8, the memory controller 800 may include the bandwidth monitoring unit 850 and the bandwidth control unit 860. The configuration and operation of the memory controller 800 of FIG. 8 may be basically similar to the configuration and operation of the memory controller 400 of FIG. 4.

The bandwidth monitoring unit 850 of the memory controller 800 may monitor bandwidths between the plurality of host devices HOST_0 to HOST_n and the memory controller 800. In detail, the bandwidth monitoring unit 850 may detect the numbers of the requests outputted through the request scheduler 830 among the requests stored in the respective request queues 810_0 to 810_n for a predetermined period, and calculate actual bandwidths for the respective host devices HOST_0 to HOST_n based on the detected results.

By referring to the monitoring results of the bandwidth monitoring unit 850, the bandwidth control unit 860 may decrease the number of first or second tokens allocated to a host device of which actual bandwidth is narrower than a target bandwidth and increase the number of first or second tokens allocated to a host device of which actual bandwidth is wider than a target bandwidth, among the plurality of host devices HOST_0 to HOST_n. In other words, the bandwidth control unit 860 may control the token information generation unit 820 to decrease the corresponding number of first or second tokens in the case of a request queue the number of which requests outputted through the request scheduler 830 for the predetermined period is less than a target value, and control the token information generation unit 820 to increase the corresponding number of first or second tokens in the case of a request queue the number of which requests outputted through the request scheduler 830 for the predetermined period is greater than a target value.

The memory controller 800 may control the numbers of tokens allocated to the respective host devices HOST_0 to HOST_n according to the results of comparing actual bandwidths and target bandwidths, thereby maximizing the efficiency of the data processing system.

A scheduling method of a memory controller, according to an embodiment, may be divided into first and second procedures. The first procedure includes selecting one request queue among a plurality of request queues, that is, selecting a request queue corresponding to one host device. The second procedure is a procedure of outputting requests stored in the selected request queue by using first and second tokens. Hereunder, the first procedure and the second procedure will be described with reference to FIGS. 9 and 10, respectively.

Figure 9:
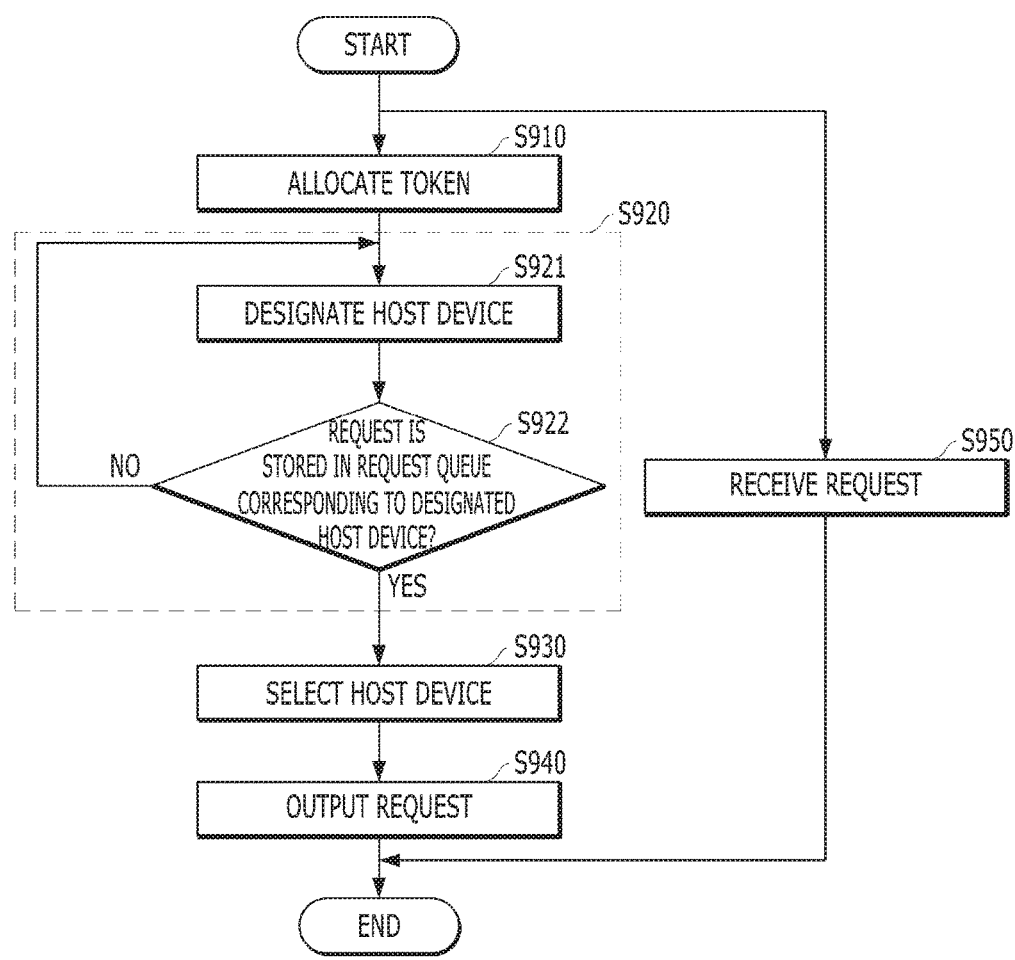
FIG. 9 is a flow chart illustrating a scheduling method of a memory controller in accordance with an embodiment.

FIG. 9 is a flow chart illustrating a scheduling method of a memory controller in accordance with an embodiment. FIG. 9 is a drawing to explain the first procedure of a scheduling method of a memory controller, that is, a procedure of selecting a request queue among a plurality of requests queues (or a host device).

Referring to FIG. 9, a scheduling method of a memory controller may include a token allocating step S910, a host device designating step S920, a host device selecting step S930, a request outputting step S940, and a request receiving step S950.

The token allocating step S910 is a step to be performed in advance before selecting a host device and outputting a request. In the token allocating step S910, the numbers of first and second tokens may be determined depending on the characteristics of the host devices or the requirements of the data processing system. Details for token allocation may be the same as described above with reference to FIG. 4.

The host device designating step S920 may be a step for designating a host device to be selected next among a plurality of host devices. In the host device designating step S920, a host device to be selected next may be designated (S921), and whether a request is stored in a request queue corresponding to the designated host device or the host device to be selected next, may be determined (S922). In the case where a request is stored in the request queue corresponding to the host device to be selected next (the designated host device) (S922, YES), the process may proceed to the host device selecting step S930, and the request queue corresponding to the designated host device is selected. In the case where a request is not stored in the request queue corresponding the designated host device or to the host device to be selected next (S922, NO), the process may proceed to the step S921, and another host device may be designated.

In the host device selecting step S930, the request queue corresponding to the designated host device may be selected.

In the request outputting step S940, the requests stored in the selected request queue may be outputted according to a sequence that is allocated by a request scheduler. In the request outputting step S940, the respective requests may be outputted by using first or second tokens.

For reference, the request outputting step S940 may be performed simultaneously with the host device designating step S920, or a portion or the entire period in which the request outputting step S940 is performed may overlap with a portion or the entire of a period in which the host device designating step S920 is performed.

Further, independently of or in association with the token allocating step S910, the host device designating step S920, the host device selecting step S930 and the request outputting step S940, the request receiving step S950 for storing the requests received from a plurality of host devices, in request queues respectively corresponding to the plurality of host devices, may be performed. The request receiving step S950 may be performed in a period that is different from the token allocating step S910, the host device designating step S920, the host device selecting step S930 or the request outputting step S940. Alternatively, a portion or the entire period in which the request receiving step S950 is performed may overlap with a portion or the entire period in which the token allocating step S910, the host device designating step S920, the host device selecting step S930 or the request outputting step S940 is performed.

Figure 10:
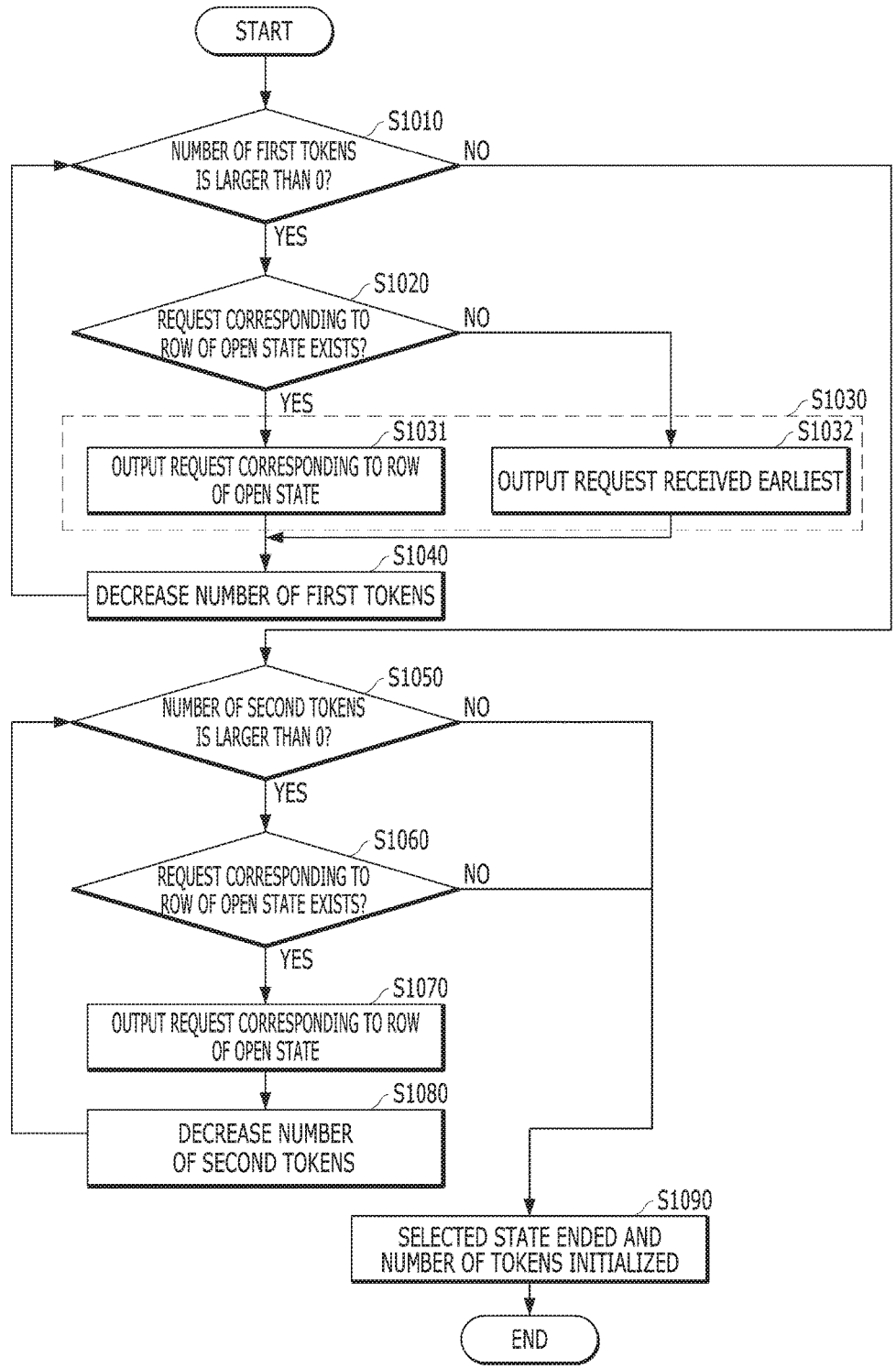
FIG. 10 is a flow chart illustrating a scheduling method of a memory controller in accordance with another embodiment.

FIG. 10 is a flow chart illustrating a scheduling method of a memory controller in accordance with another embodiment. FIG. 10 is a drawing to explain the second procedure of the scheduling method of a memory controller described above, that is, a procedure of outputting requests by using first and second tokens with a request queue selected.

Referring to FIG. 10, a scheduling method of a memory controller may include a first token checking step S1010, a first open row detecting step S1020, a first request outputting step S1030, a first token decreasing step S1040, a second token checking step S1050, a second open row detecting step S1060, a second request outputting step S1070, a second token decreasing step S1080, and a selection ending and token initializing step S1090.

In the first token checking step S1010, whether a first token remains which is capable of being used to output a request of a host device corresponding to a selected request queue may be checked. In the case where it is checked in the first token checking step S1010 that the number of remaining first tokens is greater than 0 (S1010, YES), the process may proceed to the first open row detecting step S1020. In the case where it is checked in the first token checking step S1010 that the number of remaining first tokens is 0 (S1010, NO), the process may proceed to the second token checking step S1050.

First, in the case where the process proceeds to the first open row detecting step S1020, if a request corresponding to an open state row exists among the requests stored in the request queue (S1020, YES), the process may proceed to the first request outputting step S1030 and the request corresponding to the open state row may be outputted at step S1031. If a request corresponding to an open state row does not exist among the requests stored in the request queue (S1020, NO), the process may proceed to the first request outputting step S1030 and a request received earliest may be outputted at step S1032. After a request is outputted at the step S1031 or S1032, the number of first tokens may be decreased by 1 in the first token decreasing step S1040, and then, the process may proceed again to the first token checking step S1010.

In the case where the process proceeds from the first token checking step S1010 to the second token checking step S1050, whether a second token remains which is capable of being used to output a request of a host device corresponding to a selected request queue may be checked. In the case where it is checked in the second token checking step S1050 that the number of remaining second tokens is greater than 0 (S1050, YES), the process may proceed to the second open row detecting step S1060. In the case where it is checked in the second token checking step S1050 that the number of remaining second tokens is 0 (S1050, NO), the process may proceed to the selection ending and token initializing step S1090.

In the case where the process proceeds from step S1050 to the second open row detecting step S1060, if a request corresponding to an open state row exists among the requests stored in the request queue (S1060, YES), the process may proceed to the second request outputting step S1070 and the request corresponding to the open state row may be outputted. If a request corresponding to an open state row does not exist among the requests stored in the request queue (S1060, NO), the process may proceed to the selection ending and token initializing step S1090. After the request is outputted at the step S1070, the number of second tokens may be decreased by 1 in the second token decreasing step S1080, and then, the process may proceed again to the second token checking step S1050.

In the selection ending and token initializing step S1090, the selected state of the currently selected request queue may be ended, and the process may proceed for selecting another request queue (see FIG. 9). At this time, the numbers of first and second tokens corresponding to the currently selected request queue and host device may be initialized.

In the above-described request outputting procedure, requests may be outputted sequentially according to the first-ready first-come first-served (FR-FCFS) rule in the case of the step for outputting requests by using first tokens, and requests may be outputted sequentially according to the first-ready (FR) rule in the case of the step for outputting requests by using second tokens. Moreover, in the case of determining a sequence of requests according to the FR-FCFS rule or the FR rule, whether a row address is the same as a row address of a memory device corresponding to an immediately previously selected and outputted request may be considered.

Figure 11:
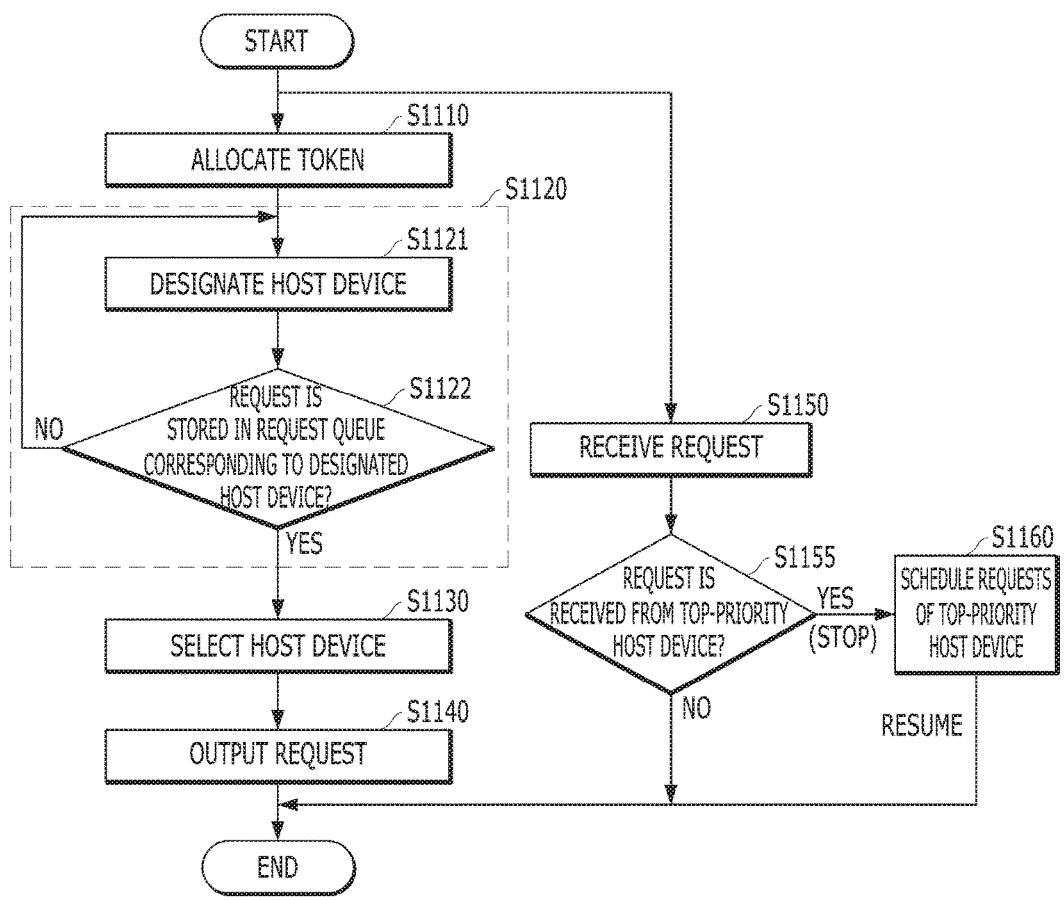
FIG. 11 is a flow chart illustrating a scheduling method of a memory controller in accordance with still another embodiment.

FIG. 11 is a flow chart illustrating a scheduling method of a memory controller in accordance with still another embodiment. Unlike the scheduling method of a memory controller shown in FIG. 9, in the scheduling method of a memory controller shown in FIG. 11, if a request is received from a top-priority host device, scheduling of requests may be performed in consideration of the request received from the top-priority host device.

Referring to FIG. 11, a scheduling method of a memory controller may include a token allocating step S1110, a host device designating step S1120, a host device selecting step S1130, a request outputting step S1140, a request receiving step S1150, and a top-priority host device request scheduling step S1160.

The scheduling method of a memory controller shown in FIG. 11 may be similar to the scheduling method of a memory controller shown in FIG. 9. However, if a request is received from a top-priority host device at step S1155 (YES) while performing the request receiving step S1150 regardless of which step is being additionally performed, the step that is being performed may be stopped (STOP), and the process may proceed to the top-priority host device request scheduling step S1160. In the top-priority host device request scheduling step S1160, the requests received from the top-priority host device may be scheduled. If the scheduling of the requests received from the top-priority host device is completed, the previous step that was being performed may be resumed (RESUME). Also, in the case where a request is not received from the top-priority host device at the step S1155 (NO), the process may be ended.

The top-priority host device request scheduling step S1160 may be the same as the method for scheduling the requests stored in a selected request queue, described above with reference to FIG. 10.

Figure 12:
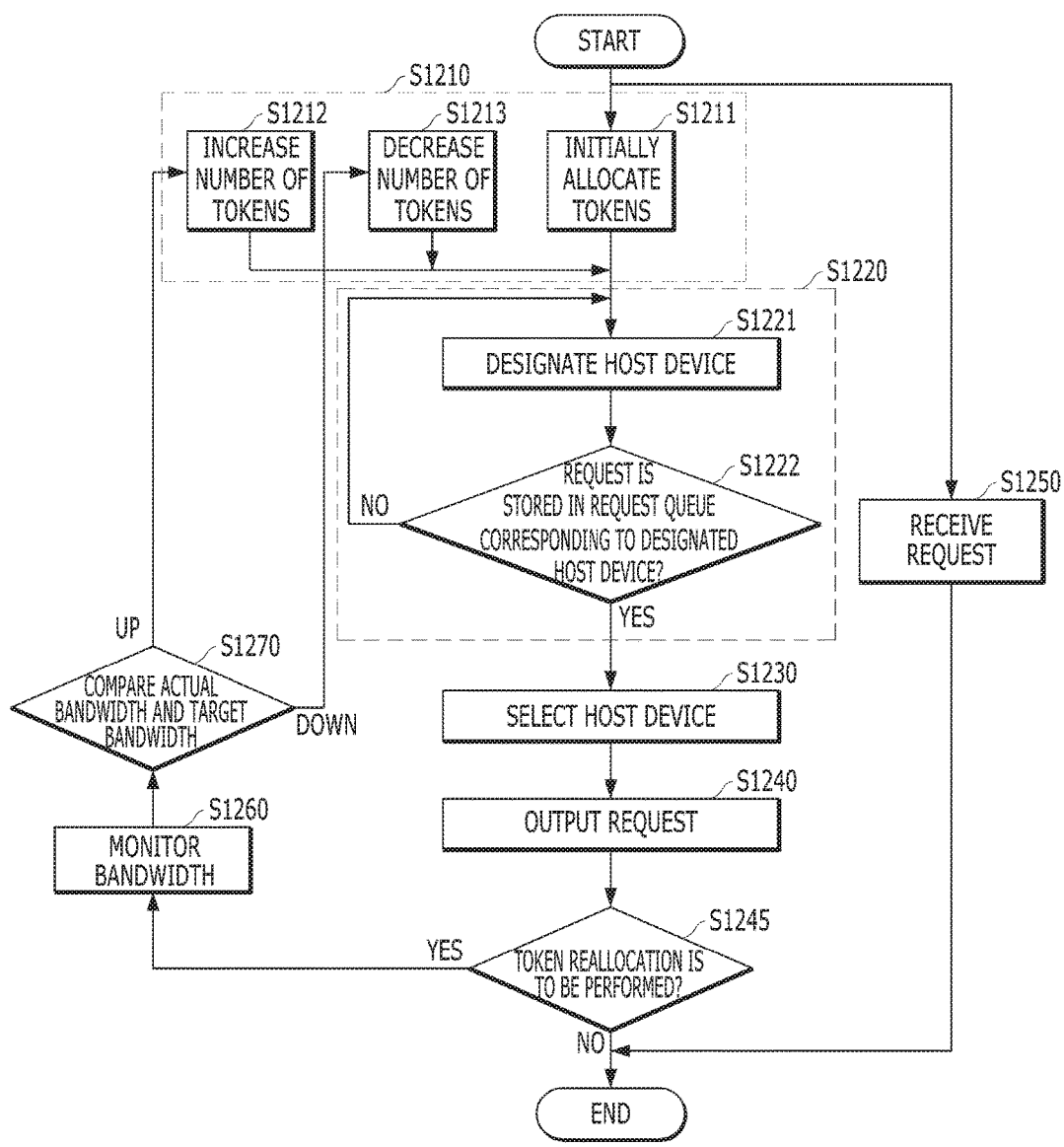
FIG. 12 is a flow chart illustrating a scheduling method of a memory controller in accordance with still yet another embodiment.

FIG. 12 is a flow chart illustrating a scheduling method of a memory controller in accordance with still yet another embodiment. Unlike the scheduling method of a memory controller shown in FIG. 9, in the scheduling method of a memory controller shown in FIG. 12, the numbers of first and second tokens allocated to each host device may be controlled in consideration of an actual bandwidth and a target bandwidth of the host device.

Referring to FIG. 12, a scheduling method of a memory controller may include a token allocating step S1210, a host device designating step S1220, a host device selecting step S1230, a request outputting step S1240, a request receiving step S1250, a bandwidth monitoring step S1260, and a bandwidth comparing step S1270.

First, the token allocating step S1210 may be divided into an initial allocating step S1211, a token increasing step S1212, and a token decreasing step S1213. The initial allocating step S1211 may be a step in which tokens are allocated without comparing actual bandwidths and target bandwidths. The token increasing step S1212 may be a step for increasing the number of first or second tokens allocated to a host device of which actual bandwidth is wider than a target bandwidth as a result of bandwidth monitoring. The token decreasing step S1213 may be a step for decreasing the number of first or second tokens allocated to a host device of which actual bandwidth is narrower than a target bandwidth as a result of bandwidth monitoring.

After performing the token allocating step S1210, the host device designating step S1220, the host device selecting step S1230, and the request outputting step S1240 may be performed. The host device designating step S1220 (including steps S1221 and S1222), the host device selecting step S1230, and the request outputting step S1240 correspond to the host device designating step S920 (including steps S921 and S922), the host device selecting step S930, and the request outputting step S940 of FIG. 9, respectively. Also, the request receiving step S1250 may be performed, which correspond to the request receiving step S950 of FIG. 9. Thus, the descriptions for the steps S1220 to S1250 will be omitted.

In the case where it is determined at step S1245 that token reallocation is not to be performed (NO), the process may be ended. In the case where it is determined at the step S1245 that token reallocation is to be performed (YES), the bandwidth monitoring step S1260 and the bandwidth comparing step S1270 may be performed.

In the bandwidth monitoring step S1260, by referring to a request scheduling result of a memory controller for a predetermined period, an actual bandwidth corresponding to each host device may be detected. In the bandwidth comparing step S1270, the actual bandwidth and a target bandwidth are compared. The process may proceed to the token increasing step S1212 in the case where the actual bandwidth is wider than the target bandwidth (S1270, UP), while the process may proceed to the token decreasing step S1213 in the case where the actual bandwidth is narrower than the target bandwidth (S1270, DOWN).

Each of the above-described requests may include contents of performing a write operation of storing data received from a host device, in a memory device, or include contents of performing a read operation of outputting data from a memory device and transferring the data to a host device.

In the present technology, two different kinds of tokens are allocated according to characteristics of respective host devices, and an output sequence of requests received from the respective host devices is determined by using the two different kinds of tokens, thereby enabling optimized request scheduling in conformity with the characteristics of the respective host devices.

Although various embodiments have been described for illustrative purposes, it will be apparent to those skilled in the art that various changes and modifications may be made without departing from the spirit and scope of the invention as defined in the following claims.

What is claimed is:

1. A memory controller comprising:
a plurality of request queues, each request queue for storing requests received from a corresponding host device among a plurality of host devices;
a token information generator configured to generate information related to the numbers of first tokens and second tokens allocated to each of the plurality of host devices; and
a request scheduler configured to select repeatedly and sequentially one among the plurality of request queues, and output requests stored in a selected request queue, by using the first and second tokens, wherein the request scheduler outputs one request per one first token and, when all the first tokens allocated to a corresponding one of the plurality of host devices are used, outputs one request per one second token,
wherein the request scheduler determines and outputs requests sequentially according to a first rule in the case of outputting requests by using the first tokens, and determines and outputs requests sequentially according to a second rule which is different from the first rule in the case of outputting requests by using the second tokens,
wherein the request scheduler selects a next request queue next to the selected request queue in one of a first case and a second case,
wherein the first case includes a case where an output request does not exist in the selected request queue, even though at least one of the first and second tokens remains, and
wherein the second case includes a case where, after the first tokens are all used, a request capable of being outputted by using the second tokens does not exist among the requests stored in the selected request queue.

2. The memory controller according to claim 1, wherein, when the next request queue is selected, the token information generator initializes information related to the numbers of first tokens and second tokens corresponding to the previously selected request queue.

3. The memory controller according to claim 1, wherein the first rule comprises a first-ready first-come first-served (FR-FCFS) rule and the second rule comprises a first-ready (FR) rule.

4. The memory controller according to claim 3, wherein, in the case of determining a sequence of requests according to the FR-FCFS rule or the FR rule, whether a row address of a memory device corresponding to the determined sequence is the same as a row address of the memory device corresponding to an immediately previously selected request is considered.

5. The memory controller according to claim 1, wherein the numbers of first and second tokens allocated to the plurality of host devices are determined depending on characteristics of the host devices.

6. The memory controller according to claim 1, wherein, in the case where at least one host device among the plurality of host devices is set as a top-priority host device, if a request is received from the top-priority host device, the request scheduler stops an operation of outputting requests of a currently selected request queue, selects a request queue corresponding to the top-priority host device, and outputs requests of the selected request queue corresponding to the top-priority host device.

7. The memory controller according to claim 1, wherein the request scheduler skips selection of a request queue in which no request is stored, among the plurality of request queues.

8. The memory controller according to claim 1, further comprising:
   a bandwidth monitor configured to monitor bandwidths between the plurality of host devices and the memory controller; and
   a bandwidth controller configured to control the number of at least one of the first and second tokens allocated to at least one of the plurality of host devices, based on the monitoring results of the bandwidth monitoring unit.

9. The memory controller according to claim 8, wherein the bandwidth controller decreases the number of the first or second tokens allocated to a host device of which an actual bandwidth is narrower than a target bandwidth, among the plurality of host devices, and increases the number of the first or second tokens allocated to a host device of which an actual bandwidth is wider than a target bandwidth, among the plurality of host devices.

10. A request scheduling method of a memory controller for outputting requests received from a plurality of host devices, to a memory device, comprising:
    allocating at least one first token and at least one second token to each of the plurality of host devices;
    storing requests received from the plurality of host devices, in a plurality of request queues respectively corresponding to the plurality of host devices;
    selecting one request queue among the plurality of request queues;
    outputting each of the requests stored in the selected request queue, per one first token; and
    outputting, when all the first tokens allocated to a corresponding one of the plurality of host devices are used, each of the requests stored and remaining in the selected request queue, per one second token,
    wherein the selecting of the one request queue comprises selecting a next request queue next to the selected request queue in one of a first case and a second case,
    wherein the first case includes a case where an output request does not exist in the selected request queue, even though at least one of the first and second tokens remains, and
    wherein the second case includes a case where, after the first tokens are all used, a request capable of being outputted by using the second tokens does not exist among the requests stored in the selected request queue,
    wherein the outputting of each of the requests stored in the selected request queue comprises determining and outputting requests sequentially according to a first rule in the case of outputting requests by using the first tokens, and
    wherein the outputting of each of the requests stored and remaining in the selected request queue comprises determining and outputting requests sequentially according to a second rule which is different from the first rule in the case of outputting requests by using the second tokens.

11. The request scheduling method according to claim 10, wherein the selecting of the one request queue comprises:
    when the next request queue is selected, initializing the numbers of first and second tokens corresponding to the previously selected request queue.

12. The request scheduling method according to claim 10, wherein the first rule comprises a first-ready first-come first-served (FR-FCFS) rule and the second rule comprises a first-ready (FR) rule.

13. The request scheduling method according to claim 12, wherein determining a sequence of requests according to the FR-FCFS rule or the FR rule comprises considering whether a row address of a memory device corresponding to the determined sequence is the same as a row address of a memory device corresponding to an immediately previously selected request.

14. The request scheduling method according to claim 10, wherein the allocating of at least one first token and at least one second token to each of the plurality of host devices comprises determining the numbers of first and second tokens allocated to the plurality of host devices depending on characteristics of the host devices.

15. The request scheduling method according to claim 10, wherein, in the case where at least one host device among the plurality of host devices is set as a top-priority host device, if a request is received from the top-priority host device, an operation of outputting requests of a currently selected request queue is stopped, a request queue corresponding to the top-priority host device is selected, and requests of the selected request queue corresponding to the top-priority host device are output.

16. The request scheduling method according to claim 10, wherein the selecting of one request queue among the plurality of request queues comprises repeatedly selecting the plurality of request queues in a predetermined sequence, wherein selection of a request queue in which no request is stored is skipped.

17. The request scheduling method according to claim 10, further comprising:
    monitoring bandwidths between the plurality of host devices and the memory controller.

18. The request scheduling method according to claim 17, wherein the allocating of at least one first token and at least one second token to each of the plurality of host devices comprises:
    decreasing the number of at least one of the first or second tokens allocated to a host device of which an actual bandwidth is narrower than a target bandwidth, among the plurality of host devices, based on the monitoring results; and
    increasing the number of at least one of the first or second tokens allocated to a host device of which an actual bandwidth is wider than a target bandwidth, among the plurality of host devices, based on the monitoring results.

* * * * *